Dec. 1, 1970  T. W. HOWE, SR  3,543,552
KNUCKLE RADIUS MACHINE
Filed March 2, 1967  5 Sheets-Sheet 3
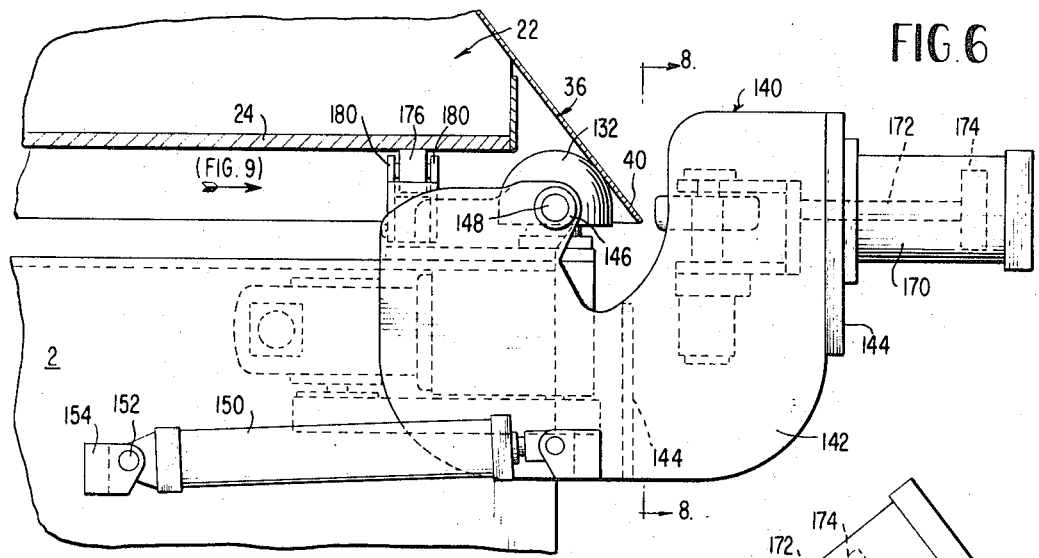
FIG. 6
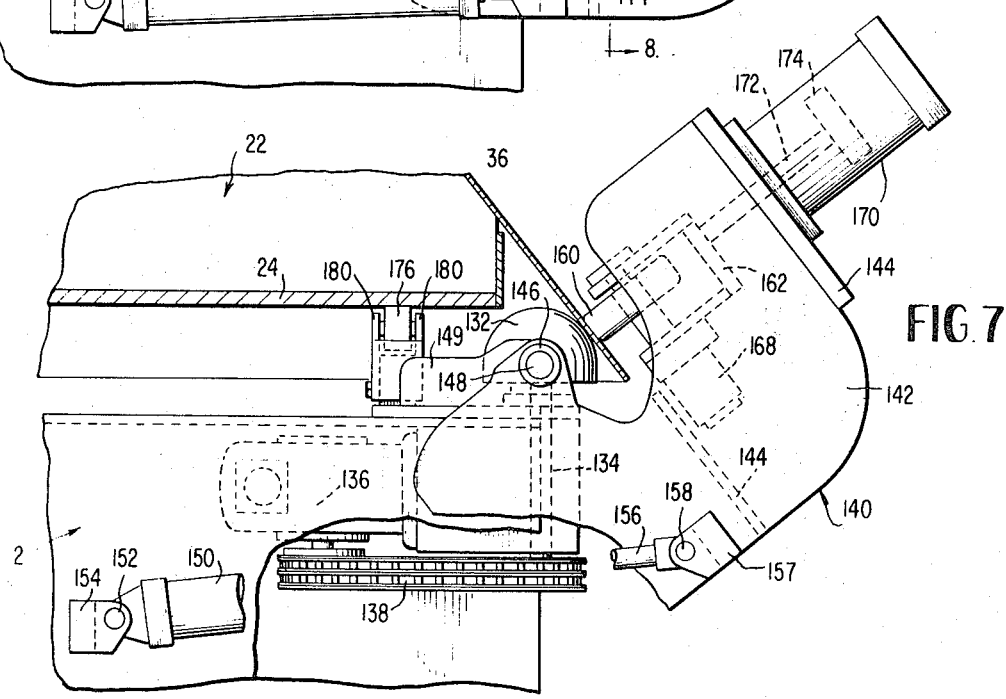
FIG. 7
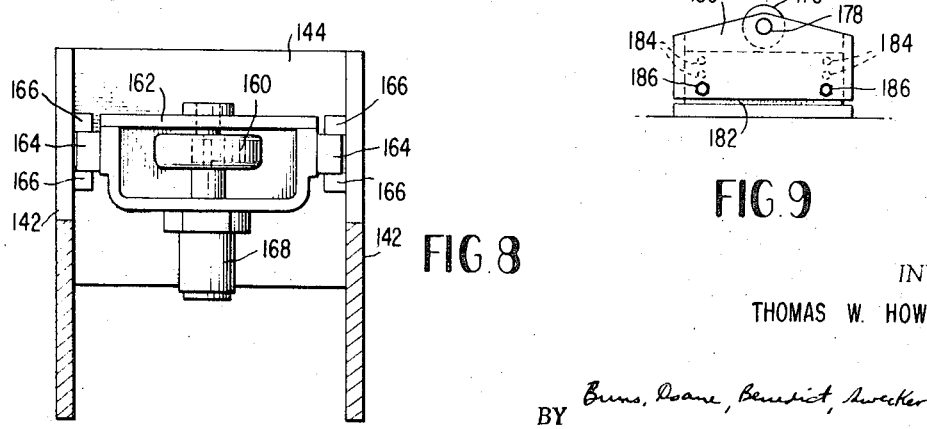
FIG. 8
FIG. 9
INVENTOR
THOMAS W. HOWE, SR.
BY *Burns, Doane, Benedict, Swecker & Mathis*
ATTORNEYS

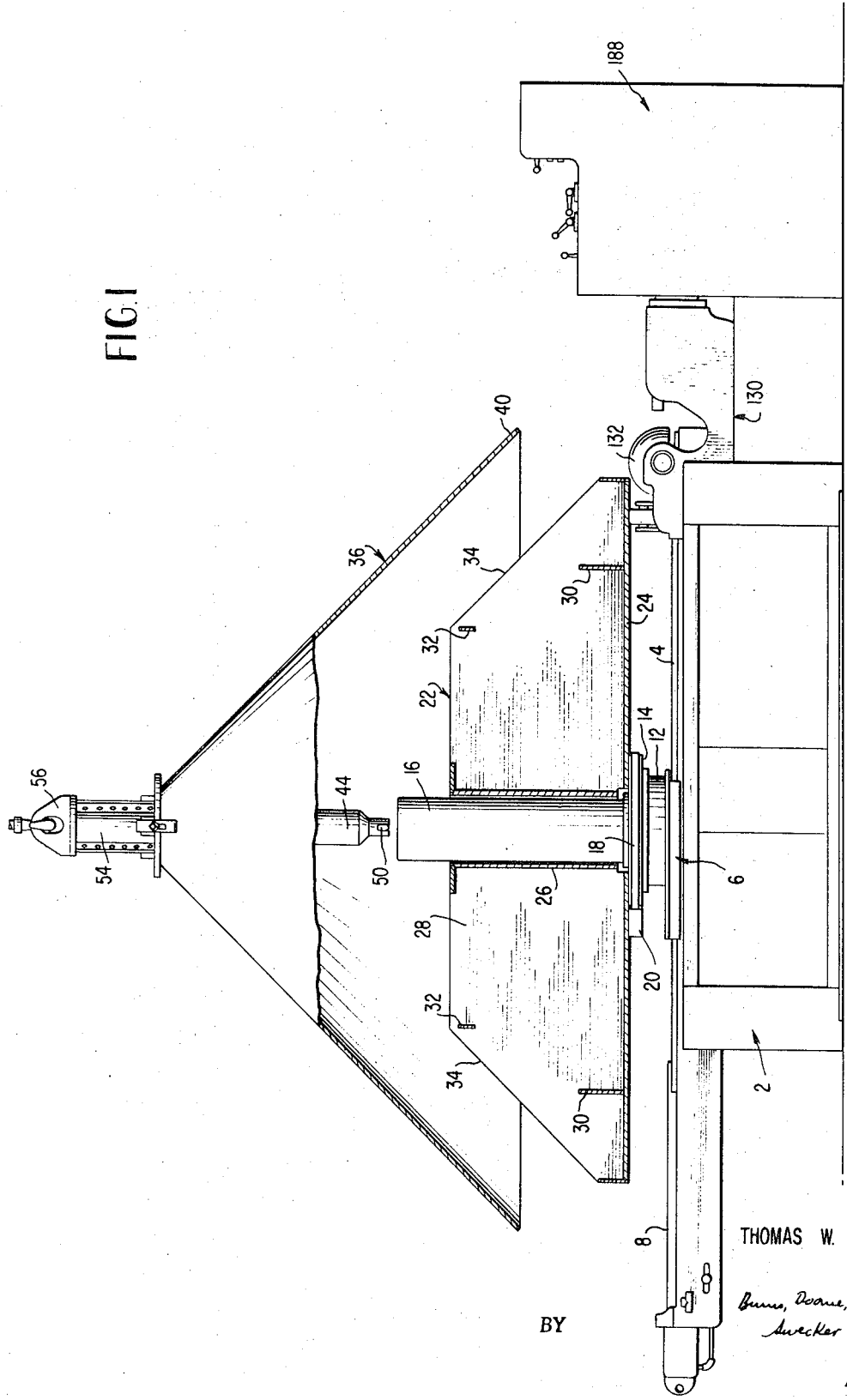

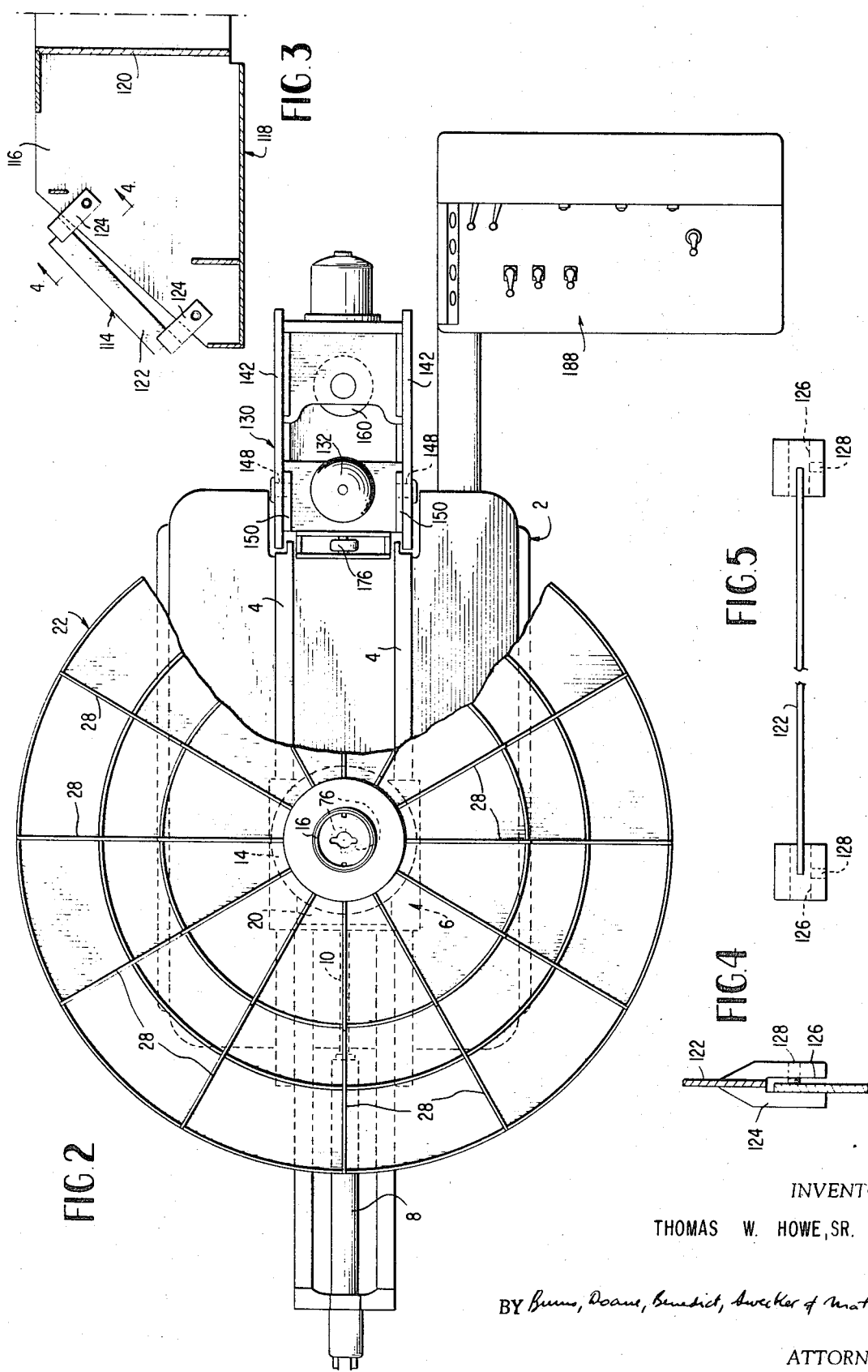

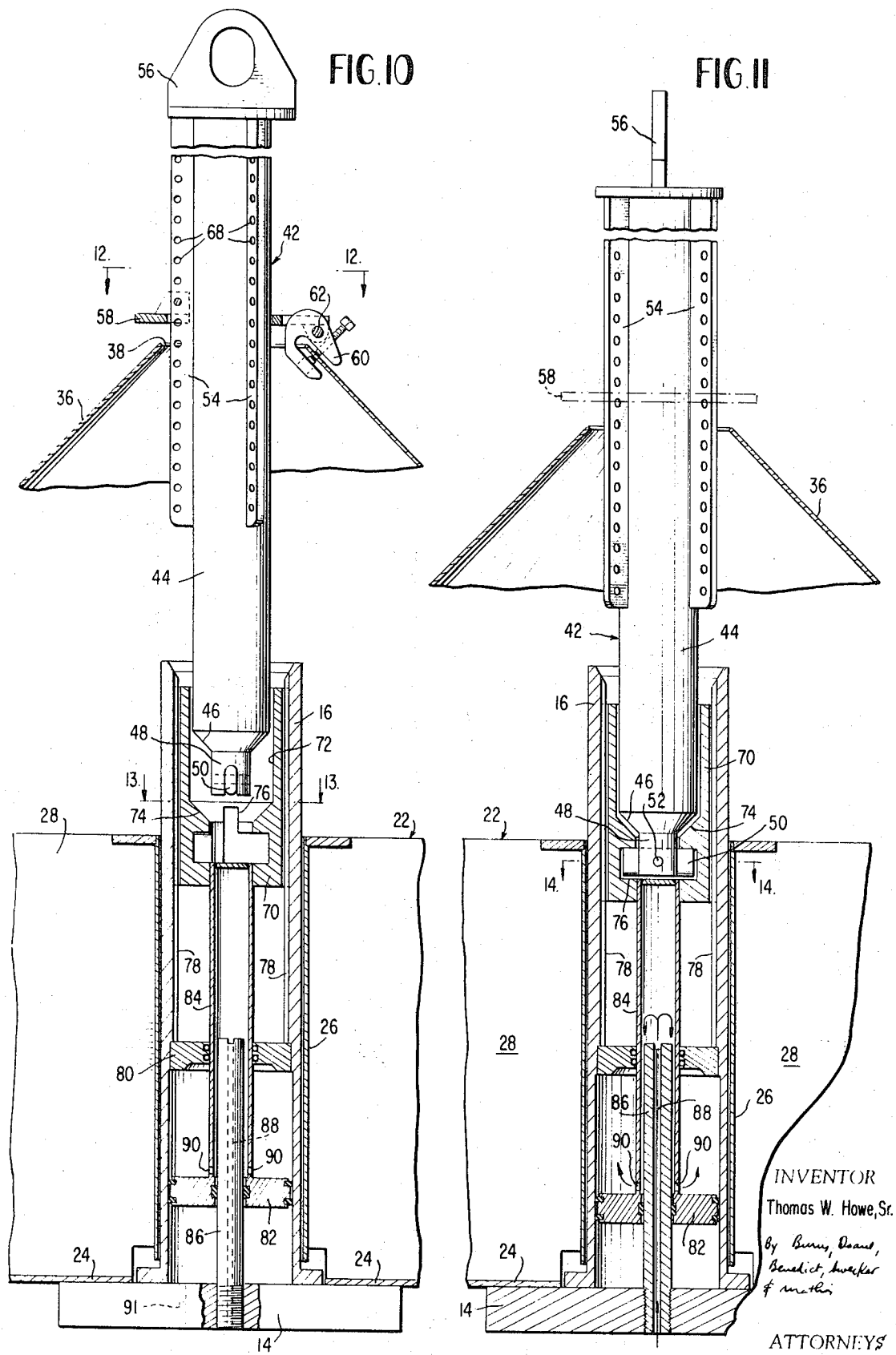

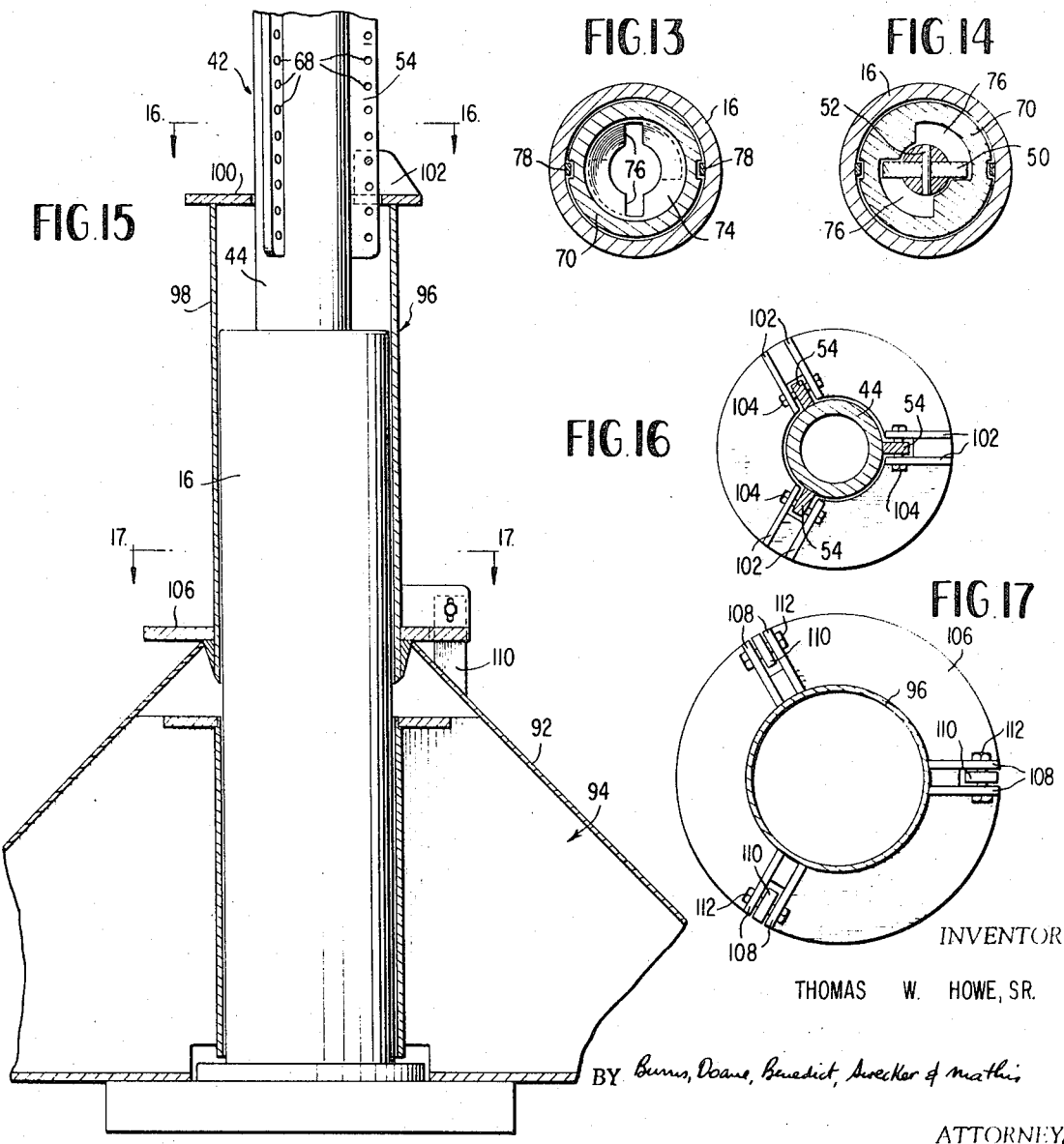

United States Patent Office 3,543,552
Patented Dec. 1, 1970

3,543,552
KNUCKLE RADIUS MACHINE
Thomas W. Howe, Sr., Duncan, Okla., assignor to Halliburton Company, Duncan, Okla., a corporation of Delaware
Filed Mar. 2, 1967, Ser. No. 619,974
Int. Cl. B21d 22/14
U.S. Cl. 72—82
20 Claims

ABSTRACT OF THE DISCLOSURE

A flanging machine having a pair of rolls between which the peripheral edge of a circular workpiece passes. The workpiece is supported on a turntable that includes an upright column. A mandrel is connected to the workpiece for lifting and transporting the workpiece. A stabilizer on the turntable rigidly supports the workpiece and when the mandrel is locked in the column, an axial force is applied to the mandrel to cause the workpiece to conform to the shape of the stabilizer and to be clamped rigidly in position relative to the pair of rolls. One of the rolls is mounted in a cradle that is journalled on the base of the machine for vertical swinging movement. As the workpiece rotates with the turntable, the cradle gradually swings relative to the base to form a flange progressively on the workpiece.

BACKGROUND OF THE INVENTION

This invention relates to metal working apparatus and more particularly to apparatus for forming flanges on circular workpieces.

In fabricating tanks of sheet metal, it is customary to form the tank in several sections and then assemble the sections by welding or other suitable means to form the completed tank. Usually the tank sections have flanges that are aligned, so that the sections may be joined together by a butt weld to produce a substantially continuous tank wall across the joint between the sections. A butt joint of this type is desirable, for example, in storage tanks for particulate material in order to avoid accumulation of material around the welded joint.

Certain storage tanks include a frustoconical section that is assembled with a dished head or a cylindrical section. In fabricating storage tanks of this type, it is necessary to provide a flange on the hollow conical section, so that it can be welded to the head or cylindrical section. Usually, the flange is formed by passing the peripheral edge of the conical section between a pair of forming rolls, which gradually bends the edge to the desired shape. It is important for the conical section to be supported rigidly during the flanging operation, since the completed flange will not fit together properly with the adjacent section of the tank if the flange is not formed accurately. Often, the conical sections are made up of several segments that are welded together. During the welding process, it is not uncommon for the conical section to be distorted out of round. Therefore, the conical section must be rigidly supported in a true conical shape during flanging, so that a properly shaped flange will be formed on the edge of the section.

Another problem concerns the convenient handling of conical sections, particularly sections of large size. These large conical sections are awkward to hoist and transport by conventional means. Several workmen may be needed to lift the large conical section onto a conventional flanging machine. Furthermore, conventional machines are not capable of accurately forming a flange on large size conical sections.

Accordingly, it is an object of this invention to provide an improved flanging machine which efficiently forms a flange on a circular workpiece.

It is a further object of this invention to provide a flanging machine that accurately supports the workpiece in the desired shape during the flanging operation.

Another object of this invention is to provide a flanging machine which can be readily operated by a single workman.

A still further object of this invention is to provide a flanging machine which is capable of forming flanges on workpieces of various shapes and sizes.

SUMMARY OF THE INVENTION

These objects are accomplished in accordance with a preferred embodiment of the invention by a flange rolling machine, having an elongated base and a turntable mounted on the base. An upright column is secured on the turntable, and a stabilizer is mounted coaxially over the column. A mandrel cooperates with the column for clamping a hollow conical section or shell over the stabilizer. A J-slot type lock is provided for connecting the mandrel to a slide in the column. A fluid actuator in the column applies a clamping force to the mandrel which rigidly fastens the shell on the stabilizer.

A flanging station is provided at one end of the base and includes a cradle which is mounted for vertical swinging movement on the base. A drive roll is mounted on the base for rotation about a vertical axis and a forming roll is mounted in the cradle opposite the drive roll. A fluid actuator is connected with the forming roll shaft for urging the forming roll toward the drive roll. The periphery of the shell that is supported on the stabilizer passes between the drive roll and the forming roll and, as the cradle swings downwardly, a flange is progressively formed on the peripheral edge of the shell.

DESCRIPTION OF THE DRAWINGS

This preferred embodiment is illustrated in the accompanying drawings in which:

FIG. 1 is a side elevational view of the flanging machine of this invention;

FIG. 2 is a top plan view of the flanging machine;

FIG. 3 is a cross-sectional view of the stabilizer showing the adjustable web attachment;

FIG. 4 is a cross-sectional view along the line 4—4 in FIG. 3;

FIG. 5 is a top plan view of the web attachment;

FIG. 6 is a side elevational view of the machine showing the flange rolling station with the cradle in the lowered position;

FIG. 7 is a side elevational view of a portion of the machine showing the flange rolling station with the cradle in a raised position;

FIG. 8 is a cross-sectional view of the cradle along the line 8—8 in FIG. 6;

FIG. 9 is a detail view of the support roller assembly;

FIG. 10 is a cross-sectional view of the turntable, showing the mandrel being lowered into the column on the turntable;

FIG. 11 is a cross-sectional view of the turntable showing the mandrel locked in the column;

FIG. 12 is a cross-sectional view of the mandrel along the line 12—12 in FIG. 10;

FIG. 13 is a cross-sectional view of the column along the line 13—13 in FIG. 10;

FIG. 14 is a cross-sectional view of the column along the line 14—14 in FIG. 11;

FIG. 15 is a side elevational view of the turntable and the mandrel, showing a modified shell clamp mounted on the mandrel;

FIG. 16 is a cross-sectional view of the mandrel along the line 16—16 in FIG. 15;

FIG. 17 is a cross-sectional view along the line 17—17 in FIG. 15, and

FIG. 18 is a cross sectional view of the workpiece showing the flange rolled on the peripheral edge.

DESCRIPTION OF THE PREFERRED EMBODIMENT

Referring to FIGS. 1 and 2, the flanging machine of this invention includes a base 2 on which is mounted a pair of rails 4. A turntable assembly 6 is mounted for sliding movement along the rails 4. A fluid actuator 8 is rigidly supported on the base 2 and has a movable piston which is connected with the turntable assembly 6 by a piston rod 10. By conducting fluid under pressure to one side or the other of the piston in the actuator 8, the turntable assembly 6 may be displaced in either direction along the rails 4.

The turntable assembly 6 includes a stationary bearing assembly 12 which supports a rotary member 14 and an upright column 16 that is mounted on the rotary member 14. The rotary member 14 normally is free to rotate relative to the stationary bearing assembly 12. A brake band 18, however, extends around the rotary member 14 and a fluid actuator 20 causes the band 18 to tighten around the rotary member 14 and rotation of the member 14 relative to the base 2 is retarded by the brake band 18.

A stabilizer 22 is mounted coaxially over the column 16 for supporting a workpiece in the form of a frustoconical shell. The stabilizer includes a bottom plate 24 that is substantially circular and has a central opening through which the column 16 extends. A sleeve 26 is positioned at the center of the stabilizer 22 and a plurality of webs 28 extend radially outward from the sleeve 26. Reinforcing members 30 and 32 extend between the webs 28 to furnish structural support for the webs. The sleeve 26, plate 24 and webs 28 are rigidly secured together by welding or other suitable means to form a unitary structure. As shown in FIG. 1, each of the webs has an outer edge 34 which is inclined outwardly. The dimensions and slope of the edges 34 correspond to the internal size and shape of the shell 36, which constitutes the workpiece. The shell 36 may be formed in any conventional manner, but usually, the shell is made up of a plurality of segments which are welded together in edge to edge abutting relation to form the completed shell 36. The shell 36 has an apex opening 38 (FIG. 10) and a peripheral edge 40 on which the flange is to be rolled.

As shown in FIGS. 1, 10 and 11, a mandrel 42 supports the shell 36. The mandrel 42 has a body portion 44 which is generally cylindrical. The lower end of the body portion 44 has a shoulder 46 and a shank 48. The shank 8 has a transverse slot and a cross key 50 extends through the slot and is secured therein by a pin 52. The body portion 44 is also provided with a plurality of radial plates 54 and a suspension member 56. A support ring 58 is mounted on the mandrel 42. As shown in FIG. 10, the ring 58 includes a plurality of claimps 60 that are supported at spaced intervals around the periphery of the ring 58. The clamps are journalled for swinging on pins 62 that extend between brackets on the ring 58. Thus, the clamps 60 may be adjusted for attachment to shells 36 having various cone angles. On the upper side, as shown in FIG. 12, the plate 58 is provided with brackets 64, positioned on opposite sides of the plates 54 and bolts 66 extend through the brackets 64 and through holes 68 in the plates 54. Preferably, the holes 68 are spaced uniformly along the length of the plates 54 and the holes in each plate are in circumferential alignment with corresponding holes in adjacent plates 54.

The column 16 includes a movable slide 70. The slide 70 has a central bore 72 and a seat 74 in the bore 72 is in position to support the shoulder 46 on the mandrel 42.

The bore 72 also has a pair of key slots 76, as shown in FIGS. 13 and 14, for receiving and locking the cross key 50 against movement relative to the slide 70. The key slots 76 are on opposite sides of the bore 72 for receiving each end of the cross key 50. Each key slot 76 has a vertical leg that opens at the seat 74 and a horizontal leg which extends around approximately 90 degrees of rotation from the vertical leg. The key slots 76 are shown schematically in FIG. 2.

Longitudinal splines 78 are secured in the interior of the column 16 to prevent rotation of the slide 70 relative to the column. A fluid retaining head 80 cooperates with the column 16 and the rotary element 4, as shown schematically in FIGS. 10 and 11, to form a fluid chamber. A piston 82 is mounted for reciprocating movement in the chamber. The piston 82 is connected with the silde 70 by a tube 84. Consequently, movement is imparted to the slide 70 in response to movement of the piston 82. A quill 86 that is mounted in the rotary member 14 extends through a central opening in the piston 82 and into the interior of the tube 84 The quill 86 has a central passage 88 which communicates with the upper side of the piston 82 through radial ports 90 in the tube 84. Another air passage 91 through the rotary member 14 communicates with the lower side of the piston 82. By conducting fluid under pressure to the upper side of the piston 82, the mandrel 42 is drawn downwardly when the cross key 50 is locked in the horizontal leg of each key slot 76, as shown in FIG. 11. In this manner, the shell 36 is clamped against the stabilizer.

Smaller size shells may be mounted on the mandrel 42 by means of an adapter, as shown in FIGS. 15, 16 and 17. A small diameter frustoconical shell 92 is shown in FIG. 15. A stabilizer 94, of a corresponding shape, is mounted on the column 16. An adapter 96, which includes a sleeve 98 and a mounting ring 100 is attached to the radial plates 54, by means of brackets 102 which are secured to the ring 100, as shown in FIGS. 15 and 16. A bolt 104 extends through each pair of brackets 102 to engage the appropriate hole in the plate 54. At the lower end of the sleeve 98, a ring 106 is welded or otherwise secured to the sleeve 98. The ring 106 includes several pairs of brackets 108 between which is supported a spacer bar 110 which bears against the outer surface of the conical shell 92 adjacent the apex opening. The spacers 110 are secured in position by bolts 112. Due to the small size of the workpiece 92, it is sufficiently light to be positioned over the column manually. The spacers 110 and ring 106, together with the mandrel 42, merely serve to impose a downward force on the shell 92 to clamp the shell against the stabilizer 94. Of course, if desired, clamps similar to the clamps 60 may be provided on the ring 106, so that the shell 92 can be lifted by the mandrel 42.

As shown in FIG. 1, web edges 34 of the stabilizer 22 are fixed in relation to the central axis of the stabilizer. Thus, a particular stabilizer is limited in its use to supporting shells of approximately the same size and cone angle as that of the edges 34. In order to permit supporting cones of slightly different sizes and cone angles, blade attachments 114, as shown in FIG. 3, may be applied to each web 116 of a stabilizer 118. The stabilizer 118 has substantially the same construction as the stabilizer 22 shown in FIGS. 1 and 2, wherein a plurality of webs 116 extend outwardly from the central sleeve 120, but the size and shape of the webs 116 are different from those of the webs 28.

The blade attachment 114 includes a rectangular blade 122 that is rigidly supported between a pair of brackets 124. Each of the brackets 124 has a slot 126 and a set screw 128 extends through one side of the bracket 124 for clamping a portion of the web 116 between the end of the set screw on the opposite side of the slot 126.

As shown in FIG. 3, the lower bracket 124 may be spaced outwardly from the edge of the web 116 a greater distance than is the upper bracket 124. In this manner, the effective cone angle formed by the outer edge of the blade 122 is different from the cone angle formed by the edge of the web 116. Of course, a blade attachment 114 is mounted on each of the webs 116 of the stabilizer 118, and the position of each blade attachment 114 is adjusted by means of the set screws to substantially the same cone angle radial distance with respect to the central axis of the stabilizer 118. Also, the depth of the blade 122 may be greater or smaller than that shown in FIG. 3 in order to provide variations in the size of the conical shells supported on the stabilizer. The size may also be adjusted by displacing the brackets 124 outwardly with respect to the web 116.

Referring now to FIGS. 1, 2 and 6 to 9, a flange rolling station 130 is provided at the end of the base 2. The station 130 includes a drive roll 132 which is mounted for rotation on a vertical spindle 134. The spindle 134 is driven by a motor through a conventional gear reducer 136 and a sprocket chain 138.

A cradle 140 is mounted for vertical swinging movement relative to the base 2. The cradle 140 includes a pair of side members 142 that are spaced apart. The side members 142 are rigidly connected together by transverse members 144 which are welded or otherwise rigidly secured between the side members 142. Each of the side members 142 has a journal bearing 146 for receiving a pintle 148 which extends outwardly from a bracket 149 on the base 2. The bearings 146 permit the cradle 140 to swing vertically relative to the base 2.

A hydraulic cylinder 150 is mounted on each side of the base 2 for imparting swinging movement to the cradle 140. As shown in FIGS. 6 and 7, the cylinder 150 is supported at one end on a hinge pin 152 in a bracket 154 which extends outwardly from the base 2. The piston in the cylinder is operatively connected with the cradle 140 by a connecting rod 156 which is secured in a bracket 157 on the side member 142 by means of a pin 158. Displacement of the connecting rod 156 toward the right, as viewed in FIGS. 6 and 7, relative to the cylinder 150, causes the cradle 140 to swing counterclockwise about the shaft 148.

A forming roll 160 is mounted in the cradle 140 in opposed relation with the drive roll 132. The forming roll 160 is journalled in bearings in a frame 162 which has outwardly projecting slide members 164. Each of the slide members 164 is supported between a pair of guides 166 that are mounted on the side members 142. A motor 168 is also mounted on the frame 162 for driving the forming roll 160.

The frame 162 is displaced relative to the guides 166 by a fluid actuator 170 which is shown schematically in FIGS. 6 and 7. The fluid actuator 170 is rigidly mounted on the transverse plate 144 and a connecting rod 172 extends between the piston of the actuator and the frame 162. A fluid pressure gauge and regulator valve may be provided in the conduit supplying fluid to the actuator 170. The gauge may be calibrated to provide an indication of the force being applied to the forming roll 160 and by controlling the fluid pressure, the force on the roll 160 can be maintained at a uniform level throughout the forming operation.

In order to assure that the frustoconical shell 36 is properly positioned with respect to the drive roll 132 and the forming roll 160, a support roller 176 is provided under the stabilizer 22 adjacent the drive roll 132. The support roller 176 is journalled for rotation on a shaft 178 which extends between a pair of upright plates 180. The plates 180 are rigidly secured to a mounting block 182 which has threaded screw holes 184. As shown in FIGS. 6 and 7, the roller 176 extends above the base 2 to approximately the same height as the peripheral surface of the drive roll 132. For larger or smaller sizes of drive rolls 132, the height of the roll 176 should be adjusted to correspond to that of the drive roll 132. This is accomplished by providing a plurality of threaded screw holes 184 in the mounting block 182 which are spaced vertically relative to the base 2. By selectively positioning the screws 186 in the appropriate hole 184, the height of the roller 176 relative to the base may be adjusted. The shell 36 is shown in FIG. 18 in its finished shape with the flange formed by the rolls 132 and 160 on the peripheral edge 40.

As shown in FIGS. 1 and 2, the operating console 188 is positioned adjacent the forming station 130, so that the forming operation may be readily observed by the operator. Suitable controls are provided on the console 188 for operating the various components of the machine.

In operation, a drive roll 132 of the appropriate radius is installed on the spindle 134. The height of the support roller 176 is adjusted by means of the screws 186 to the corresponding height of the drive roll 132. A stabilizer 22 of an appropriate size and having web edges of the proper included cone angle is installed on the turntable 6 by lowering the stabilizer over the column 16. If necessary, blade adapters 114 may be installed on each of the webs of the stabilizer to correspond to the size and cone angle of the shell workpiece, if these dimensions differ slightly from those of the stabilizer.

The mandrel with the ring 58 attached is suspended over the shell 36 by an overhead crane or other suspension device. A hook attached by a cable from the crane is connected with the suspension member 56 on the upper end of the mandrel 42, as shown in FIG. 1. The mandrel is lowered through the apex opening 38 in the shell 36 until the ring 58 engages the shell. The support ring is then secured to the shell 36 by means of the clamps 60. The mandrel 42 is then lifted and the shell is suspended over the turntable 6 and stabilizer 22. Of course, in assembling the ring 58 with the mandrel, the ring 58 may be secured to the shell 36 before the mandrel is lowered through the apex opening in the shell. The ring 58 then is fastened to the mandrel flanges 54 at the appropriate height.

The mandrel is lowered into the bore 72 of the slide 70, as shown in FIG. 10. The brake band 20 is tightened around the rotary member 14 in order to prevent rotation of the column 16 and the slide 70. The mandrel 42 is turned until the cross key 50 is aligned with the vertical leg of each of the slots 76. When the cross key 50 seats in the horizontal leg of the J-slot 76, the mandrel 42 is rotated 90 degrees relative to the slide 70. This may be accomplished by grasping the peripheral edge of the shell 36, and rotating the shell manually through 90°. The mandrel is then locked in the slot 76 and cannot move axially relative to the slide 70. Fluid under pressure is then conducted through the passage 88 in the quill 86 to create a pressure differential across the piston 82. This pressure differential urges the piston downwardly relative to the column 16, thereby applying a downward force through the mandrel 42 on the shell 36, so that the shell 36 is rigidly clamped on the stabilizer 22.

The forming roll 160 is retracted away from the drive roll 132, as shown in FIG. 6, to allow the peripheral edge 40 of the cone to extend into the space between the rolls. Fluid pressure is then introduced into the interior of the cylinders 150 on opposite sides of the base 2 to swing the cradle 140 vertically to the position shown in FIG. 7. In this position, the forming roll 160 lies in a plane that is approximately perpendicular to the surface of the shell 36. The forming roll 160 is urged against the shell 36 and against the drive roll 132 by the fluid pressure behind the piston 174. The band brake 18 on the turntable is released and the motor 136 is started to turn the drive roll 132. The frictional engagement of the drive roll and forming roll with the shell 36 causes the shell, turntable 6, and the stabilizer 22 to rotate relative to the base 2. While the shell is rotating, sufficient pressure is applied by the cylinder 170 to the forming roll 160 to cause deformation of the peripheral edges 60, as the cradle 140 gradually swings downwardly relative to the base 2. The forming roll 160 may be either free-wheeling, so that it is driven by the movement of the shell 36, or motion may be imparted to the forming roll by the motor 168, so that both the forming roll and the drive roll turn the shell 36.

The drive roll 132 has a spherical surface and the axis of the pintles 148 about which the cradle 140 swings passes through the center of curvature of the spherical surface. The forming roll 160 thus swings in an arc that is concentric with the spherical surface of the roll 132. Therefore, the thickness of the shell flange that is formed is substantially uniform.

After the forming of the flange on the peripheral edge 40 has been completed, the forming roll 160 is retracted by means of the cylinder 170 and rotation of the drive roll 132 is stopped. The brake band 18 is applied to the rotary member 14 to hold the turntable stationary during removal of the shell 36. The fluid pressure on the upper side of the piston 82 is relieved and the shell is rotated counterclockwise with respect to the column 16. When the cross key 50 is aligned with the vertical leg of each slot 76, the mandrel 42 and the shell 36 may be raised from the machine and transported to a convenient location by means of an overhead hoist. The workpiece 36 is then separated from the mandrel 42 by releasing the clamps 60 and raising the mandrel 42 out of the apex opening in the shell 36.

Although the machine of this invention is particularly well suited for forming a knuckle radius flange on frustoconical shells of relatively large size, the same machine may be used for forming flanges on dished heads, or flat heads merely by providing a suitable support on the turntable for the particular shape of workpiece. Also, an offset flange may be formed in tank cylinders by substituting appropriate drive and forming rolls for the rolls 132 and 160. Thus, this machine is capable of performing a variety of flanging operations in addition to the significant improvement in quality and production rates that are achieved in flanging frustoconical shells.

In forming the knuckle radius on a frustoconical shell, the forming roll 160 pivots about the center of curvature of the drive roll 132 to produce a true inside radius in the knuckle area of the shell. The pressure of the forming roll on the workpiece is controlled to prevent objectionable thinning out of material during the flanging operation. Due to the rigid mounting of the shell on the stabilizer during the flanging operation, a shell that is considerably out of round after welding is shaped into a round and smooth shell during the forming operation. The configuration of the machine, and particularly the position of the console relative to the forming station, permits the operator to conveniently observe the progress of the work at all times. Furthermore, the entire operation can be accomplished by one operator without additional help.

While this invention has been illustrated and described in one embodiment, it is recognized that variations had changes may be made therein without departing from the invention as set forth in the claims.

What is claimed is:

1. A flange rolling machine comprising a base, a turntable on said base, means for rotating said turntable relative to said base, an upright column on said turntable, a stabilizer, means for mounting said stabilizer on said column, a pair of flanging rolls on said base, said stabilizer having work supporting surfaces thereon, said stabilizer surfaces being positioned at a substantially fixed distance from the central axis of said column and extending outwardly to support a workpiece adjacent said rolls, means for engaging the workpiece independently of said stabilizer surfaces, and means located within and cooperating with said column for displacing said engaging means axially of said column to clamp the workpiece against said stabilizer surfaces, whereby a workpiece is rigidly supported by the stabilizer while a flange is being formed by the rolls.

2. A flange rolling machine according to claim 1 wherein said stabilizer is substantially circular and has a central opening through which said column extends, and said engaging means is supported by said column while a workpiece is clamped against said stabilizer.

3. A flange rolling machine according to claim 2 wherein said stabilizer has a bottom plate extending around the circumference of said stabilizer, said base having a support roller mounted for rotation on said base adjacent said flanging rolls, and in engagement with said bottom plate whereby said stabilizer is supported in predetermined relation with said forming rolls.

4. A flange rolling machine according to claim 2 wherein said stabilizer surfaces include a plurality of radial webs, said webs each having an outer edge adjacent to periphery of said stabilizer, said outer edge having a lower end and an upper end, said lower end being spaced a greater distance from the center of said stabilizer than said upper end.

5. A flange rolling machine comprising a base, a turntable on said base, means for rotating said turntable relative to said base, an upright column on said turntable, a stabilizer, means mounting said stabilizer on said column, a pair of flanging rolls on said base, said stabilizer extending outwardly to support a workpiece adjacent said rolls, said stabilizer having a plurality of radial webs, said webs each having an outer edge adjacent the periphery of said stabilizer, said outer edge having a lower end and an upper end, said lower end being spaced a greater distance from the center of said stabilizer than said upper end, said web edges defining a frustoconical support surface coaxially about said column, and means for clamping a workpiece against said stabilizer, whereby a workpiece is rigidly supported by the stabilizer while a flange is being formed by the rolls.

6. A flange rolling machine comprising a base, a turntable on said base, means for rotating said turntable relative to said base, an upright column on said turntable, a pair of flanging rolls on said base, a mandrel, means for attaching a workpiece on said mandrel, slide means movable axially in said column, means for releasably coupling said mandrel to said slide means for axial movement of said mandrel by said slide means, stabilizer means on said turntable around said column, and means in said column for displacing said slide means axially of said column, whereby a workpiece is clamped on said stabilizer means upon axial displacement of said mandrel by said slide means.

7. A flange rolling machine according to claim 5 wherein said slide means has a socket therein aligned with said column, and including means for selectively locking said mandrel in said socket.

8. A flange rolling machine according to claim 6 wherein said displacing means includes a movable piston in said column, for connecting said piston with said slide means for movement by the piston, and means for introducing fluid under pressure to one side of said piston to apply force to said slide means.

9. A flange rolling machine according to claim 8 wherein said connecting means includes a sleeve extending between said slide and said piston, said piston having a central opening therein, said piston cooperating with said column to form a first fluid chamber between said turntable and said piston and a second fluid chamber on the opposite side of the piston, said introducing means includes a quill on said turntable, said quill extending through said piston opening and into said sleeve in coaxial relation, seal means between said quill and said piston, said quill having a fluid passage therein communicating between said second chamber and a source of fluid.

10. A flange rolling machine comprising a base, a rotary member on said base, means for rotating said rotary member relative to said base, an upright column on said rotary member, a pair of flanging rolls on said base, a mandrel, means in said column for receiving said mandrel, lock means for selectively securing together said mandrel and said receiving means, means on said mandrel for attaching a workpiece, work support means on said rotary members having a work support surface between said member and said mandrel attaching means when said mandrel and receiving means are secured together, and means on said base for displacing said mandrel attaching means toward said rotary member, whereby said machine is capable of clamping a workpiece between said support surface and said mandrel attaching means.

11. A flange rolling machine according to claim 10 wherein said lock means includes a lug, one of said mandrel and said receiving means having a slot therein and the other having said lug thereon in position to engage in said slot for securing said mandrel against movement relative to said receiving means.

12. A flange rolling machine according to claim 11 wherein said slot has an axial leg and a leg extending at right angles to said axial leg, means for preventing rotation of said receiving means relative to said column, and brake means for selectively preventing rotation of said turntable relative to said base, whereby rotation of said mandrel relative to said turntable displaces said lug into said right angle leg for securing together said mandrel and receiving means.

13. Workholder apparatus for frustoconical shells comprising a base, an upright column, a mandrel, means for securing said mandrel in telescoping relation in said column, a stabilizer, said stabilizer being substantially circular and being supported on said base substantially coaxially of said column, said stabilizer having a plurality of radial webs, said webs each having an outer edge, said web edges defining a frustoconical support surface, means on said mandrel for attaching said shell to said mandrel at the apex opening of said shell, whereby the mandrel holds a workpiece on the stabilizer web edges and aligned with the central axis of the column.

14. Workholder apparatus according to claim 13 wherein said mandrel has a plurality of axially extending external flanges, a support ring, bracket means on said ring for attachment to said flanges, clamp means on said ring for attachment to a workpiece, whereby the position of the ring may be adjusted along the length of the flanges to accommodate shells of various heights.

15. Workholder apparatus according to claim 14 wherein said flanges have a plurality of holes therein, said holes being spaced apart in rows extending axially of said mandrel, corresponding holes in each flange being aligned in a radial plane with respect to said mandrel, said bracket means including a bifurcated bracket and a pin for each flange, said pin for each bracket extending through said flange hole, whereby the bearing plate is secured in a radial plane on said mandrel.

16. Workholder apparatus according to claim 13, wherein said stabilizer webs include adjustable attachments, said attachments, being substantially aligned with said webs, means at opposite ends of each attachment for securing said segment to one of said webs, said securing means including means for adjusting the distance between said attachment end and the central axis of the column, whereby shells of various shapes and sizes may be mounted on the stabilizer.

17. In a flange rolling machine of the type wherein a flange is formed on a circular workpiece having a substantial height by clamping the workpiece in a fixture on the base of the machine with the peripheral edge of the workpiece passing between a pair of rolls at a flanging station on the base to form a peripheral flange on the workpiece, the improvement of a flanging station comprising a drive roll journalled on said base for rotation about an axis, motor means for rotating said drive roll, a cradle, means mounting said cradle on said base for swinging movement about an axis perpendicular to said drive roll axis, said cradle axis intersecting said drive roll axis, a forming roll, means mounting said forming roll on said cradle for rotation about an axis perpendicular to said cradle axis, the periphery of said forming roll being spaced from said drive roll to form a gap therebetween, motor means for swinging said cradle, and means for displacing said forming roll axis along a path relative to said cradle toward said drive roll thereby reducing the width of said gap, whereby a flange is progressively rolled by rotating a workpiece between said drive roll and said forming roll while swinging said cradle.

18. The flange rolling machine according to claim 17, wherein said drive roll has a partially spherical surface, the center of said forming roll moving in a circular path about the spherical center of said drive roll upon swinging movement of said cradle.

19. The flange rolling machine according to claim 17 wherein said cradle includes a pair of side members, said cradle mounting means including hinge means at one end of each side member, said forming roll being mounted at the opposite end of said side members.

20. The flange rolling machine according to claim 19 including guides on said side members at said opposite end, said guides extending substantially radially of said cradle axis, a mounting plate, said forming roll being journalled in said mounting plate.

References Cited

UNITED STATES PATENTS 2,379,840  7/1945  Stuhlman _____ 72—83 X
2,349,606  5/1944  Berg et al. _____ 72—85

CHARLES W. LANHAM, Primary Examiner

A. L. HAVIS, Assistant Examiner

U.S. Cl. X.R.

72—101; 269—21